J. F. HOCKER.
FILTERING CAN AND THE LIKE.
APPLICATION FILED NOV. 13, 1911.
1,028,023.
Patented May 28, 1912.
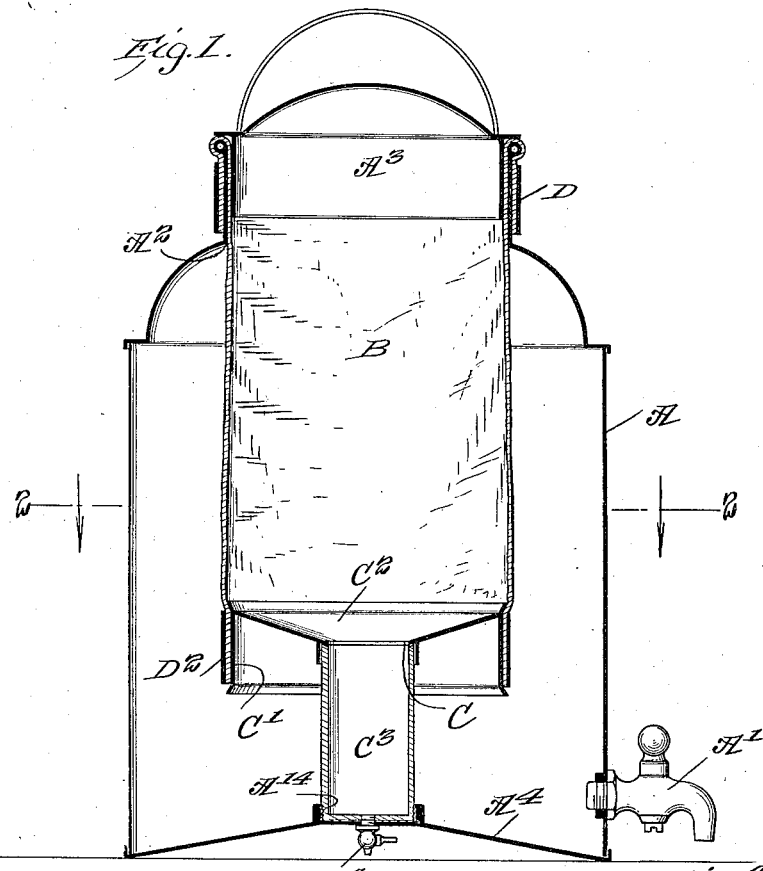
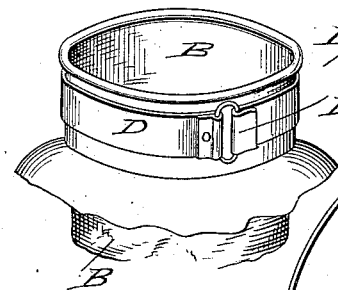
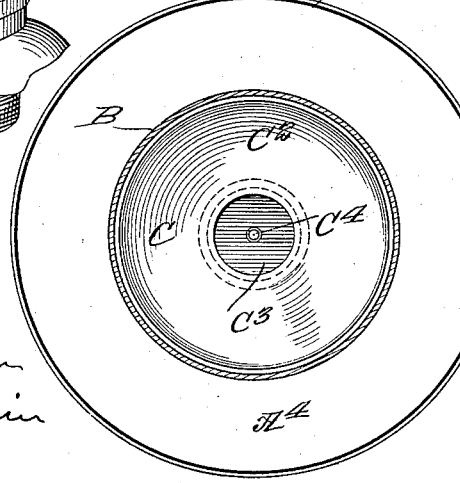
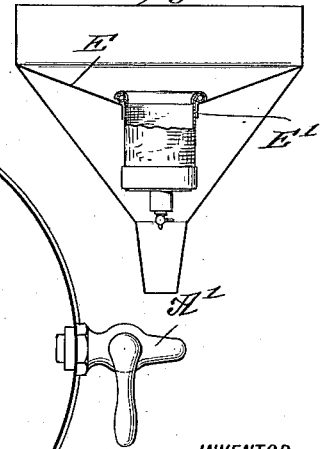
WITNESSES
INVENTOR
JOHN F. HOCKER
BY
ATTORNEYS

UNITED STATES PATENT OFFICE.

JOHN FRANKLIN HOCKER, OF MONROE, INDIANA.

FILTERING-CAN AND THE LIKE.

1,028,023.  Specification of Letters Patent.  Patented May 28, 1912.

Application filed November 13, 1911. Serial No. 659,927.

*To all whom it may concern:*

Be it known that I, JOHN F. HOCKER, a citizen of the United States, and a resident of Monroe, in the county of Adams and State of Indiana, have invented certain new and useful Improvements in Filtering-Cans and the Like, of which the following is a specification.

This invention is an improvement in filtering cans and the like and especially in cans designed for holding gasolene; and the invention consists in certain novel constructions and combinations of parts as will be hereinafter described and claimed.

In the drawing Figure 1 is a vertical longitudinal section of a can embodying my invention. Fig. 2 is a cross section thereof on about line 2—2 of Fig. 1. Fig. 3 is a detail perspective view showing the neck of the can. Fig. 4 shows the invention embodied in a funnel.

In general respects, the can A is similar to the can ordinarily used around homes or garages as a filler for automobiles, motor boats, motorcycles, flying machines, stationary gasolene engines or other devices to which it may be desired to discharge gasolene and is provided with a faucet $A'$ through which the gasolene may be discharged and with a neck $A^2$ which may be closed by the top $A^3$ as best shown in Fig. 1.

An important feature of my invention is the provision of the tubular filter B within the can in connection with the receiver C at the bottom of the tubular filter B as best shown in Fig. 1. The filter B is preferably of chamois brought into tubular form and passed through the neck $A^2$ of the can with its upper end bent down over the outer side of said neck as shown in Figs. 1 and 2 and secured by a band D which may be suitably fastened at $D'$ as shown in Fig. 3. This secures the upper end of the tubular filter in connection with the can and the lower end of the filter B is secured by a similar band $D^2$ upon the tubular flange $C'$ depending from the outer edge of the cone $C^2$ at the upper end of the water cup $C^3$, the latter being of metal and water tight and threaded at $A^{14}$ to the bottom $A^4$ of the can and being provided with a discharge cock $C^4$ so the water can be drawn off whenever desired.

Manifestly minor changes may be made without departing from the broad features of my invention as before described, whereby I provide the can with a strainer or filter designed to separate water from the gasolene and also to eradicate any other foreign substances. In practice the chamois filter B can be conveniently removed by unscrewing the cup $C^3$ at $A^{14}$ and removing the tubular filter and parts $C'$, $C^2$ and $C^3$ through the neck of the can.

In practice the can may be used as any ordinary faucet or spout gasolene can by which the gasolene may be transported from the supply house or tank and used in whole or in part as desired, being practically airtight since the cover or top $A^3$ will be packed within the neck $A^2$ by the chamois tube as before described.

In the use of the can, any water in the gasolene will settle down into the cap $C^3$ in such manner as to avoid any interference with the gasolene passing through the chamois filter.

I not only avoid the necessity of a separate filtering funnel, but by employing a vertical tubular filter or strainer, of any suitable substance, preferably chamois, the water is permitted to settle at once to the bottom of the receiver while the gasolene can pass out into the can, the filtering operation being facilitated by the large filtering surface supplied by the tubular chamois filter.

In practice, the body portion of the filtering apparatus may be in the form of a can A as shown in Fig. 1 or it may be in the funnel form shown in Fig. 4. In the latter construction, there is a false bottom E having at its center a neck $E'$ corresponding to the neck $A^2$ of the can A and the tubular filter is, in the construction shown in Fig. 4, clamped to the neck $E'$ and depends within the body of the can. Manifestly in practice this construction may be utilized instead of the can construction shown in Fig. 1, it being understood that the receiver at the lower end of the filter in Fig. 4 may be substantially like the receiver C with its parts $C'$ and $C^2$ as shown in Fig. 1.

I claim:—

1. A filtering apparatus, substantially as herein described, comprising a body having a neck and a bottom, a cup supported on the bottom and projecting within the body, a sloping or conical portion at the upper end of said cup and discharging thereto and provided with a cylindrical flange, a tubular filter clamped at its lower end to said flange and extending thence up through the neck and down along the outer side thereof, a band clamping the filtering tube to the outer side of said neck and a top, substantially as and for the purposes set forth.

2. A filtering apparatus having a water cup and a depending cylindrical flange at its outer side combined with a tubular filter secured at its lower end to said cylindrical flange, and a support for the upper end of the filter substantially as set forth.

3. A filtering apparatus comprising a body, a filter proper placed vertically inside the body and a receiver at the bottom of said filter and having an outer flange to receive the filter proper and also having a cup and a sloping or conical portion leading thereto, substantially as set forth.

JOHN FRANKLIN HOCKER.

Witnesses:
CLARENCE R. SMITH,
CHAS. E. BALMER.

Copies of this patent may be obtained for five cents each, by addressing the "Commissioner of Patents, Washington, D. C."